United States Patent
Chatani

(10) Patent No.: US 6,810,528 B1
(45) Date of Patent: Oct. 26, 2004

(54) SYSTEM AND METHOD FOR PROVIDING AN ON-LINE GAMING EXPERIENCE THROUGH A CATV BROADBAND NETWORK

(75) Inventor: Masayuki Chatani, Foster City, CA (US)

(73) Assignee: Sony Computer Entertainment America Inc., Foster City, CA (US)

(*) Notice: Subject to any disclaimer, the term of this patent is extended or adjusted under 35 U.S.C. 154(b) by 0 days.

(21) Appl. No.: 09/453,497

(22) Filed: Dec. 3, 1999

(51) Int. Cl.[7] .............................................. H04N 7/173
(52) U.S. Cl. .................. 725/109; 725/133; 725/141; 463/42
(58) Field of Search ........................... 725/96, 97, 101, 725/105, 109, 110, 118, 121, 131; 463/40, 41, 42, 1; H04N 7/173; A63F 9/24, 13/00; G06F 17/00, 19/00

(56) References Cited

U.S. PATENT DOCUMENTS

| | | | |
|---|---|---|---|
| 4,247,106 A | 1/1981 | Jeffers et al. ................. 273/85 |
| 5,051,822 A | 9/1991 | Rhoades ....................... 358/86 |
| 5,624,316 A | * 4/1997 | Roskowski et al. ........... 463/45 |
| 5,630,757 A | 5/1997 | Gagin et al. .................. 463/43 |
| 5,775,996 A | * 7/1998 | Othmer et al. ................ 463/40 |
| 5,790,753 A | * 8/1998 | Krishnamoorthy et al. . 709/203 |
| 5,830,069 A | 11/1998 | Soltesz et al. ................ 463/42 |
| 5,943,150 A | * 8/1999 | Deri et al. .................... 359/49 |
| 5,956,485 A | 9/1999 | Perlman ................. 395/200.34 |
| 5,964,660 A | 10/1999 | James et al. ................... 463/1 |
| 6,468,160 B2 | * 10/2002 | Eliott .......................... 463/43 |

FOREIGN PATENT DOCUMENTS

GB 2 120 507 A 11/1983

* cited by examiner

*Primary Examiner*—Vivek Srivastava
(74) *Attorney, Agent, or Firm*—Martine & Penilla, LLP

(57) ABSTRACT

A system for providing online content, in particular interactive gaming, over a network includes a server terminal as part of a head end facility and a client console located in one or more household facilities. A multi-band CATV network connection is established for connecting the client console with the server terminal. A display device, which may be connected to the client console or set up as a standalone device, is provided as part of the household facility and is connected with the server terminal through a band of the network connection.

50 Claims, 3 Drawing Sheets

SYSTEM AND METHOD FOR PROVIDING AN ON-LINE GAMING EXPERIENCE THROUGH A CATV BROADBAND NETWORK

BACKGROUND OF THE INVENTION

1. Field of the Invention

The present invention relates to systems for enabling a networked gaming experience in an interactive environment in which one or more game console devices is/are connected with a server system through a bi-directional communications network, wherein the server system is capable of receiving uploaded data from the game console in the form of instructions for progression of a game implemented by a server-side program component, and the console device receives downloaded data from the server which reflects a next step or updated status of the game for use by a complementary program component executed in the game console, along with providing audio/visual signals for displaying the state of the game on a TV display device.

2. Description of the Related Art

In recent years, players have been able to enjoy interactive gaming not only through use of an isolated game console located, for example, in a household and operated in conjunction with a game card or CD-ROM disk containing a game program, but also by connection to bi-directional communications networks which enable such services as downloading of new games into the game console, or interactive gaming for one or more players by means of complementary operation with a game program component executed on a server network station. In the latter case, because the game is operated in consort with a server-side executed program component, it is necessary for the user or users to be connected to the server during playing of the game, with successive uploading and downloading of data packets occurring between the server and game console, and hence the term "online gaming" has been used to describe such systems.

Currently, online gaming can be provided through a conventional telephone line or a high-speed communications network (such as ISDN or cable modem connections), wherein the network carries only data in the form of user instructions and updated status information between a networked game console and a game server. In such systems, it is contemplated that complementary program components are executed in tandem, simultaneously within the game console and the game server, wherein the program components must share information across the network. For example, when a user desires to execute a move or otherwise make some play in the game, data or variable information which represents the desired play (user input) is transmitted across the network and received by the game server. At this time the received data, potentially along with other similar data received from other players, are inputted as variables to the program component executed in the game server which then processes the data to update the next status of the game. Then, data reflecting the updated status of the game is transmitted from the game server through the network and received by one or more connected consoles, which utilize such data in a game console-side executed program component which issues commands to graphics and/or sound processing units, or the like, which in turn output audio and visual signals to a display device.

A simplified explanation of how sharing of data takes place between a game server 10 and a networked game console 60, over a bi-directional communications network, in accordance with a conventional technique, is shown in FIG. 3. In this example, a server-side network facility comprises one or more game servers 10 in which a server-side component of a game program is to be loaded and executed, the game server 10 being connected across a local area network (LAN) 20 through which the game server 10 is able to access various programs and interactive media content stored in peripheral storage devices (not shown) accessible through the LAN 20. In the typical case of multiple game servers 10, a router 30 for directing data to a designated computer according to an address associated with the data packet received by the router 30 is provided on the server-side facility, by which signals received from client game consoles can be properly directed through the LAN 20 to a designated game server 10.

On the client side of the system, a household facility comprises a network capable game console 60, a cable modem or network adapter device 50, and a TV display device 80 connected to the game console 60. The game console 60 loads and executes a client side component of a game program, wherein the client side program component is responsible for generation of commands for controlling sound and display processing units (not shown) which are housed in the game console 60. Although not shown, it shall be understood that multiple household facilities may establish network connections with the game server 10 simultaneously, wherein the respective game consoles 60 in each household load and execute multiple versions of the same program making up the game console-side component of the video game.

When an online game is desired to be played by a user, a network connection is established between the game server 10 and the game console 60 through the cable modem or network adapter device 50. At this time, a game console-side component of the game program is loaded into the game console 60, which may be loaded either from a storage media 70, such as a CD-ROM disk, or may be downloaded from the game server 10. A complementary server-side component of the program is run in the game server 10, in particular wherein data in the form of instructions from the user and updated status information from the game server are transferred over the network connection.

According to this conventional technique, the responsibility for audio and video outputs to the display device 80 are handled exclusively by processing units housed in the game console 60, whereas only data signals are transferred back and forth between the game server 10 and the game console 60.

Examples of other conventional systems, making use of a CATV network, have been described in a variety of sources. For example, systems for the distribution of video games are known from U.S. Pat. No. 4,247,106 to Jeffers et al. and U.S. Pat. No. 5,051,822 to Rhoades.

In Jeffers et al., a plurality of video games are made available, by time-division multiplexing, for downloading into a player console which selects one of the available games for loading into a game program memory. With this system, however, although an individual user can access programs from a CATV network, execution of the program and display of graphics takes place exclusively on the player console side and not through complementary operation with a program component executed on the server side.

Similarly, Rhoades relates to a distribution system which enables the downloading of video game software from a remote game storage center on a pay-per-play basis over a CATV network. However, once a given program is downloaded and resident in a game console (home computing element), execution of the game, and related audio/visual outputs therefor, are facilitated by graphics and sound generators provided locally in the game console.

Examples of multi-player interactive gaming systems in which complementary program components are operated in respective server and game terminals, with data transfer occurring across a network, are known from U.S. Pat. No. 5,830,069 to Soltesz et al. and U.S. Pat. No. 5,630,757 to Gagin et al.

Soltesz et al. describe a system in the context of an interactive bingo game, wherein a bingo number is automatically selected and captured on video at a server site, and the video picture is digitized and sent through a wide area network (WAN), which may comprise a CATV network, to separate PCs which then redraw the graphic and display it on a screen at a plurality of respective participation sites. Players can then enter a command from the screen site computer, signaling a bingo, which is then uploaded to the server site where verification is performed. Although this system does contemplate some limited sharing of data between server and participation sites along with sending of graphics over a network, the graphics must be received and redrawn in a PC at each participation site, and thus the display function is necessarily dictated by the graphics capability of each PC.

Gagin et al. provide a good example of a system in which a multi-player interactive game is facilitated over a robust cable network, wherein the game application software is made up of a server component and a user (or user console) component. Status information on the progress of a game is transmitted over a CATV network between the user sites and the server site, so that for example, for a game in which multiple player positions are constantly changing, status information, made up of position data in which the new locations of all the players are determined, can be sent to each user. In this system as well, however, the graphics display functions are handled solely by the user or game console component of the program, in association with the graphics ability of each game console, so that only game control information is exchanged without exchanging graphics information to each user. As representative of a system for transfer of data signals between a game server and a game console, for operation of respective program components, the disclosure of Gagin et al. shall be expressly incorporated by reference into the present disclosure.

U.K. Patent Application No. GB2120507A to Weitzel discloses an interactive video game arrangement intended for play by multiple players using telephones to interact with the video game as it is being displayed on a TV receiver which is connected to a head end facility through a CATV connection. In this instance, since a common push-button telephone is used in effect as the gaming console, the user side of the system does not store or execute any program component, but rather the entire program execution takes place by a computer in the head end facility. Further, according to this system, a pair of different network connections must be opened and operated simultaneously, namely, a connection via ordinary telephone lines and a separate CATV connection for sending of video signals. Further, the system does not permit output of graphic signals directly to a TV display from a game console, and therefore is somewhat restricted in terms of its versatility.

SUMMARY OF THE INVENTION

A main object of the invention is to provide a system and method for online gaming over a cable TV (CATV) network, wherein a client-side household facility receives both data signals and separate digitally encoded audio/visual signals, enabling the audio/video signals, which are potentially of higher resolution than the graphics capability of the game console, to be sent directly to a TV display device, whereas data signals, comprising user instructions and status information for progression of a game, are transferred between a game server and a networked game console over the same CATV network.

Alternatively, the game console is operable in a mode analogous to known interactive gaming devices, as described above, wherein video and audio signals can be generated by processing units in the game console itself and sent to a TV display device at lower resolution. The system is thus adaptable to the graphics quality attainable by the TV display device.

A further object of the invention is to provide a system in which a game console is connected with a game server over a CATV network, wherein the data signals are transferred between the game server and the game console through a cable modem or network adapter connection, and wherein audio and video signals from the game server are transmitted toga TV monitor through a signal multiplexing device.

A still further object of the present invention is to provide a network capable game console containing internal graphics and sound processors therein, for transmitting audio and video signals of a given resolution quality directly from the game console to a TV display device in the event a game program is run locally from the game console, while suspending such local audio and video signals in favor of higher quality audio and video signals received from a game server over a CATV network in the event the game console has established a network connection with the game server and the TV display device is capable of displaying the higher resolution audio/visual signals.

The above and other objects, features and advantages of the present invention will become apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
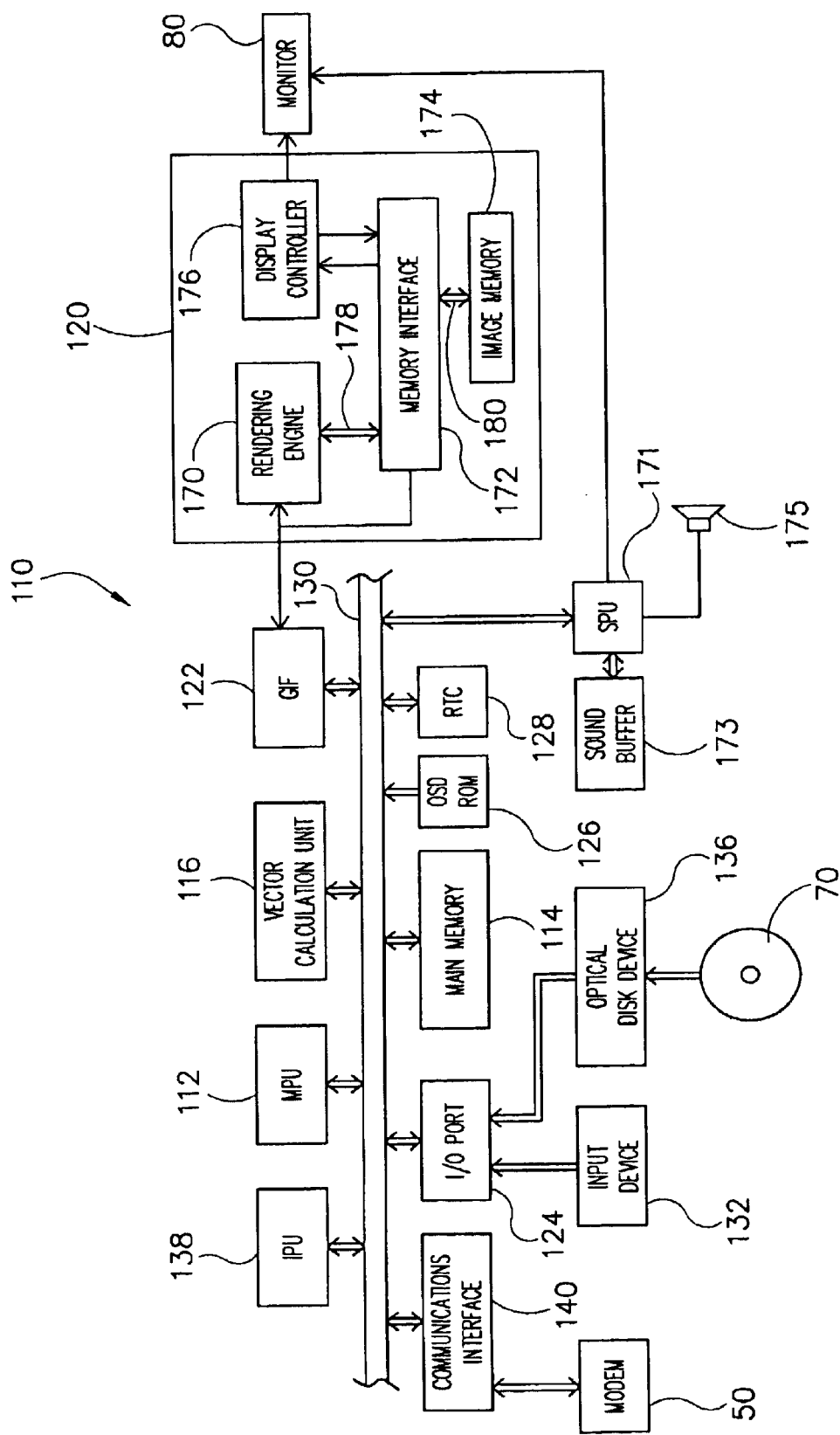
FIG. 1 is a block diagram showing an example of a configuration of a main part of a video game console adapted to include a networking ability.

FIG. 1 is a block diagram of a configuration of a main part of the video game console 60.

The game console 60 constitutes an entertainment system 110 according to the present invention which, as shown in FIG. 1, is equipped by a multiprocessor unit MPU 112 for control of the overall system 110, a main memory 114 which is used for various program operations and for storage of data, a vector calculation unit 116 for performing floating point vector calculations necessary for geometry processing, an image processor 120 for generating data based on controls from the MPU 112, and for outputting video signals to a monitor 80 (for example a CRT), a graphics interface (GIF) 122 for carrying out mediation and the like over a transmission bus between the MPU 112 or vector calculation unit 116 and the image processor 120, an input/output port 124 for facilitating reception and transmission of data to and from peripheral devices, an internal OSD functional ROM (OSDROM) 126 constituted by, for example, a flash memory, for performing control of a kernel and the like, and a real time clock 128 having calendar and timer functions.

The main memory 114, vector calculation unit 116, GIF 122, OSDROM 126, real time clock 128 and input/output port 124 are connected to the MPU 112 over a data BUS 130.

Further connected to BUS 130 is an image processing unit 138 which is a processor for expanding compressed moving images and texture images, thereby developing the image data. For example, the image processing unit 138 serves functions for decoding and development of bit streams according to the MPEG2 standard format, macroblock decoding, performing inverse discrete cosine transformations, color space conversion, vector quantization, and the like.

A sound system is constituted by a sound processing unit SPU 171 for generating musical or other sound effects on the basis of instructions from the MPU 112, a sound buffer 173 into which waveform data may be recorded by the SPU 171, and a speaker 175 for outputting the musical or sound effects generated by the SPU 171. It should be understand that the speaker 175 may be incorporated as part of the display device 80 or may be provided as a separate audio line-out connection attached to an external speaker 175.

A communications interface 140 is also provided, connected to the BUS 130, which is an interface having functions of input/output of digital data, and for input of digital contents according to the present invention. For example, through the communications interface 140, user input data may be transmitted to, and status data received from, a server terminal 10 (see FIG. 2).

An input device 132 (also known as a controller) for input of data (e.g. key input data or coordinate data) with respect to the entertainment system 110, and an optical disk device 136 for replay of the contents of an optical disk 70, for example a CD-ROM or the like on which various programs and data (i.e. data with respect to objects, texture data and the like), are connected to the input/output port 124.

The above-mentioned image processor 120 includes a rendering engine 170, a main interface 172, an image memory 174 and a display control device 176 (e.g., a programmable CRT controller, or the like).

The rendering engine 170 executes operations for rendering of predetermined image data in the image memory 174, through the memory interface 172, and in correspondence with rendering commands which are supplied from the MPU 112.

A first BUS 178 is connected between the memory interface 172 and the rendering engine 170, and a second BUS 180 is connected between the memory interface 172 and the image memory 174. First BUS 178 and second BUS 180, respectively, have a bit width of, for example, 128 bits, and the rendering engine 170 is capable of executing high speed rendering processing with respect to the image memory 174.

The rendering engine 170 has the capability of rendering, in real time, image data of 320×240 pixels or 640×480 pixels, conforming to, for example, NTSC or PAL standards, and more specifically, at a rate greater than ten times to several tens of times per interval of from $\frac{1}{60}$ to $\frac{1}{30}$ of a second.

The image memory 174 employs a unified memory structure in which, for example, a texture rendering region and a display rendering region, can be set in a uniform area.

The display controller 176 is structured so as to write the texture data which has been retrieved from the optical disk 70 through the optical disk device 136, or texture data which has been created on the main memory 114, to the texture rendering region of the image memory 174, via the memory interface 172, and then to read out, via the memory interface 172, image data which has been rendered in the display rendering region of the image memory 174, outputting the same to the monitor 80 whereby it is displayed on a screen thereof.

There shall now be described, with reference to FIG. 2, an overall system configuration incorporating the video game console 60 described in FIG. 1, in which the game console 60 is intended for connection over a CATV network with a game server 10, and in which audio/visual signals may be transmitted directly to a TV monitor display device 80 from the game server 10. In the following descriptions, constituent elements of the invention which are the same as those already described above shall be designated by like reference numerals.

Figure 2:
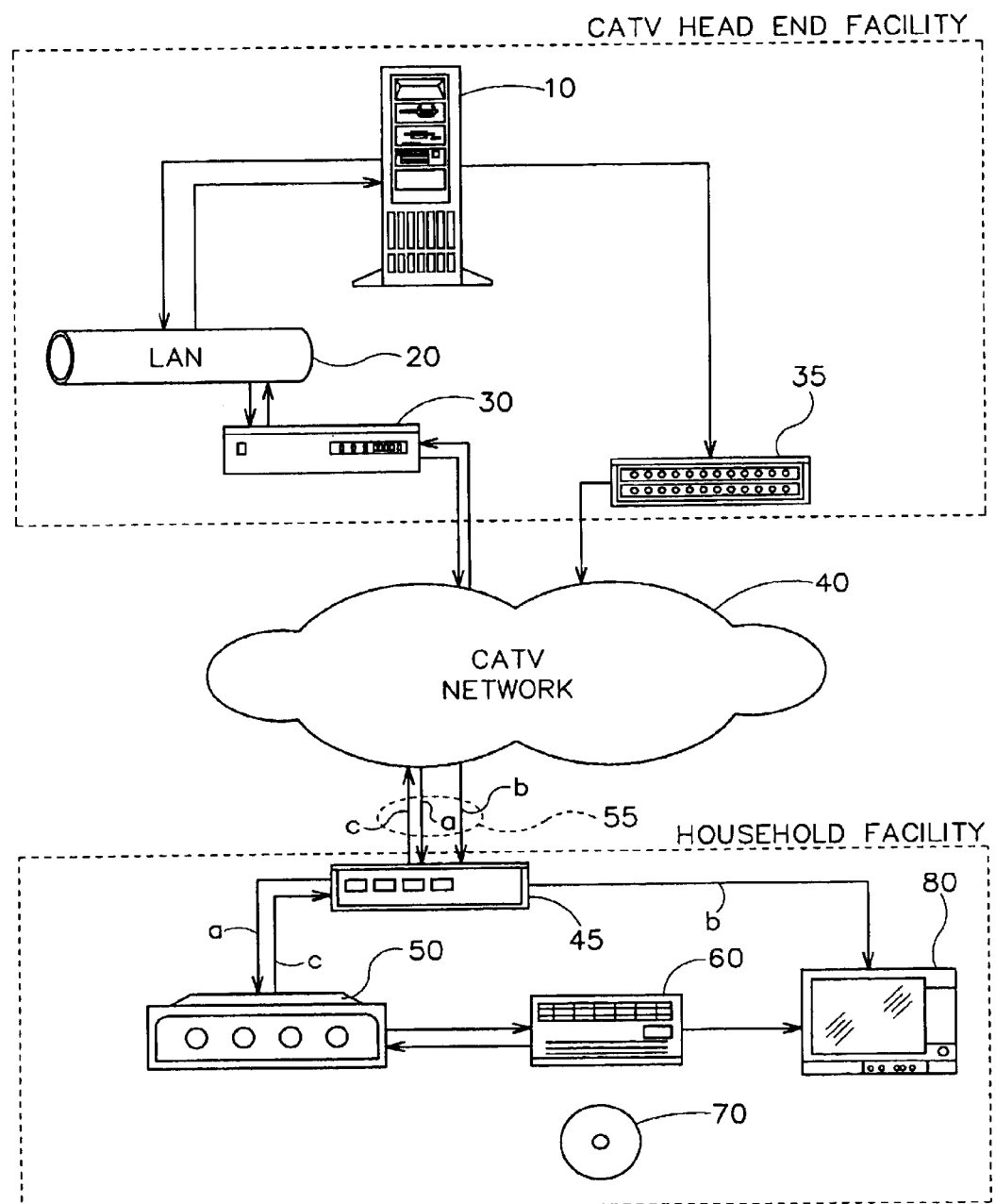
FIG. 2 illustrates an overall system configuration, incorporating the video game console described in FIG. 1, in which the game console is intended for connection to a game server over a CATV network.

As shown in FIG. 2, the system is composed of a so called head end facility of a CATV network in which one or more game server terminals 10 are disposed for reception and transmission of data signals, and well as for transmission of high resolution audio/visual signals, and a household facility comprising the game console 60, wherein the game server 10 and game console 60 respectively are connected over a bi-directional communications network in the form of a CATV network 40. For simplicity of explanation, only one household facility shall be described, although it shall be understood that more than one household facility, though which multiple connections to the game server are made, typically make up the overall system design.

The head end facility comprises one or more game servers 10 for providing online gaming services, a local area network (LAN) 20, a router 30 and a signal multiplexer 35.

The game server 10 receives inputs from users from the networked game console 60 which is connected to the game server 10 through the CATV network 40. The game server 10 further outputs audio/visual signals which are to be sent to a TV monitor 80 in the household. As described previously, in the ordinary case, the game server 10 has the capability of receiving inputs from multiple networked game consoles 60, whereby the game server 10 sends data to each of the networked game consoles 60 which may comprise, for example, an acknowledgement of receipt of data and/or synchronization or trigger signals for each of the networked game consoles 60 connected to the CATV network 40.

The game server 10 is typically connected to a local area network (LAN) 20 which provides a network backbone inside the CATV head end facility and through which the game server 10 is able to access various programs and interactive media content stored in peripheral storage devices (not shown) accessible through the LAN 20. In the typical case of multiple game servers 10, the LAN 20 is used for interconnecting the multiple servers for handling various types of data. In the present invention, the LAN 20 further serves for carrying data from the game server 10 to the networked game consoles 60 and vice versa. A router 30 is provided for directing data to a designated computer according to an address associated with data packets received by the router 30, so that data signals received from client game consoles 60 can be properly directed through the LAN 20 to a designated game server 10.

Audio/visual outputs from the game server 10, which comprise high resolution audio/visual segments encoded, for example, in MPEG2 format for playback on the TV monitor 80 in coordination with a program component executed in the game console 60, are first directed to a signal multiplexer 35, which is a known device commonly employed in a CATV head end facility. The signal multiplexer 35 functions to combine or multiplex plural segments of audio/visual data logically into a single data stream or signal, which is made up of multiple sub-channels, which is then sent out from the multiplexer 35 through the CATV network 40 as a data stream for reception by a TV monitor 80 which includes the necessary internal controls (not shown) for decoding and displaying such audio/visual data.

Therefore, as described above, the game server 10 according to the present invention functions to output two distinct types of signals, namely, data signals and audio/visual signals. The game server 10 and game console 60 are capable of both receiving and transmitting data signals. Such data signals are used by both the game server 10 and the networked game console 60, through interaction of complementary game program components which are run, respectively, in each unit. The data signals are modulated so as to be transmitted and received through the CATV network 40, according to a known industry standard, for example as defined by DOCSIS (data over cable services interface specifications). The operation and character of such data signals are essentially analogous to that of the conventional system described in relation to FIG. 3, with the exception that, in the present invention, the game console 60 has the optional capability of disabling the handling of graphics and sound processing internally in the game console 60, and rather to receive audio/visual signals from the game server 10 through the CATV network, the audio/visual signals being displayed on the TV monitor 80 in a synchronized, coordinated or simulcast manner with execution of the game program component in the game console 60.

Figure 3:
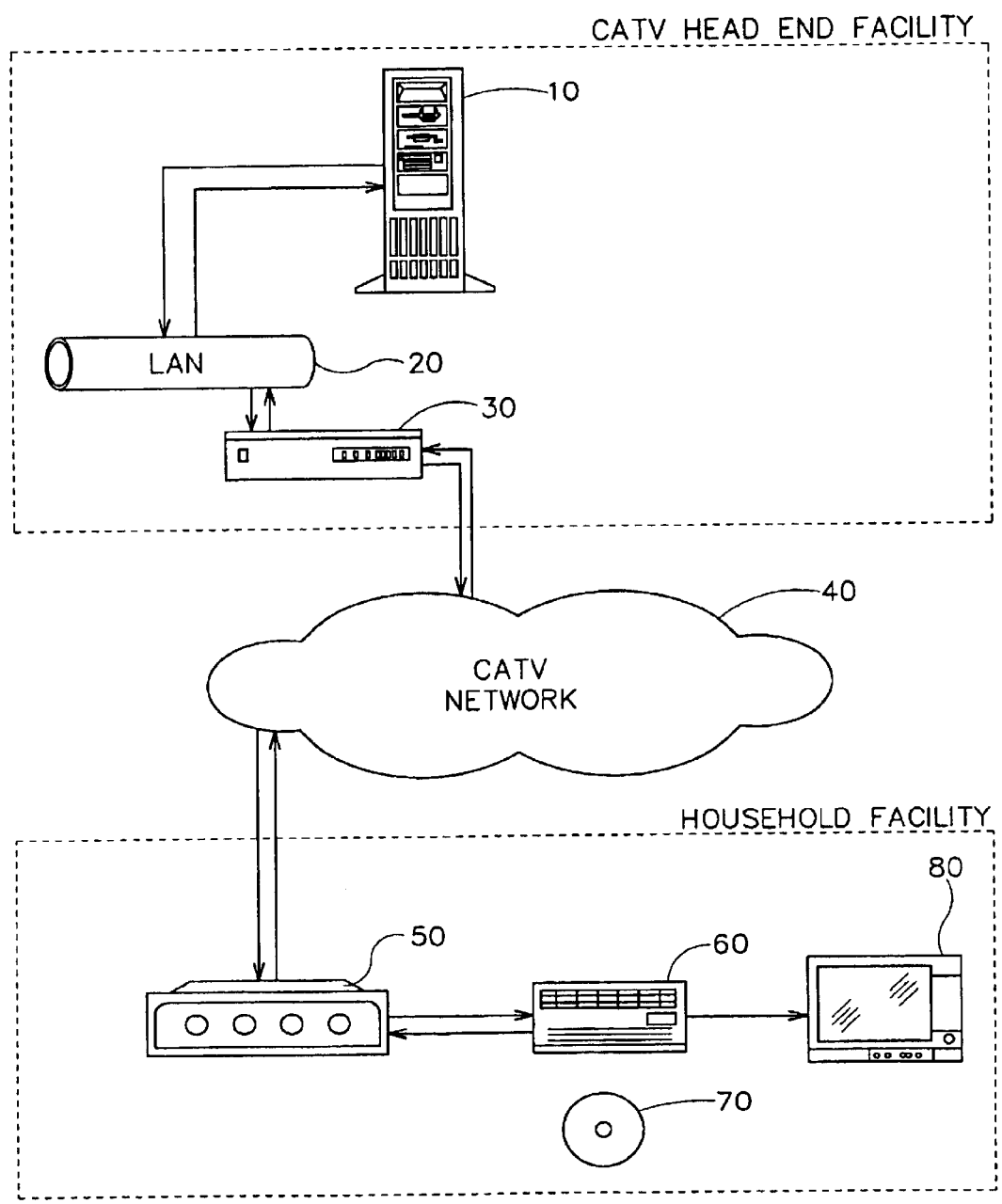
FIG. 3 is a system configuration for engaging in interactive online gaming while connected with a game server, in accordance with a conventional method.

The household facility side of the system comprises essentially the same components as the conventional system shown in FIG. 3, namely a network capable game console 60, a cable modem or network adapter device 50 which modulates and demodulates data signals sent and received between the game server 10 and the game console 60, and a TV display device 80 connected to the game console 60, in additional to a signal splitter 45.

The signal splitter 45 serves to tune respective frequency bands out of a multi-band CATV signal 55 made up of bands ranging from 0–750 MHz and used for transferring both upward (to the server 10) and downward (to the game console 60) directed signals between the game server 10 and the networked game console 60. More specifically, for downward directed data signals, a band a selected from within the frequency range of 50–750 MHz is used though which signals are sent to the cable modem 50. For downward directed audio/visual signals, a different band b selected from within the same 50–750 MHz range is used, through which the audio/visual signals are directed to the TV monitor. For upward directed data signals, a band c selected from within the frequency range of 0–50 MHz is used. Each band, and especially band b for handling downward audio/visual content, is capable of handling multiple channels through time multiplexing. The signal splitter 45 therefore serves basically two functions. One is to split the downward signals received through the CATV network 40 to the household facility into two frequency tuned bands a and b, one of which is for the TV monitor 80 and other of which is for the cable modem 50. The other function is to avoid upward data signals c from the cable modem 50 from interfering with the TV signals b, by ensuring that such upwardly directed signals c are allotted into a separate frequency band c which is sufficiently frequency-distanced from the downward signal band b.

Normally, the networked game console 60 includes a storage media 70 for distribution of packaged media such a media games, movies, music and the like, wherein CD-ROM and DVD-ROM are examples of such storage media. In accordance with the practice of the present invention, the storage media 70 will also contain a network software program for establishing the CATV network connection through the cable modem 50. Alternatively, it is possible for the network software to the resident in the game console 60.

The TV monitor 80 displays signals received either from the game console 60 (generated by image processor 120, image processing unit 138 and sound processing unit 120, as discussed in relation in FIG. 1) or digital audio/visual signals received from the game server 10. The TV monitor is capable of displaying one or more TV formats, such as NTSC, PAL, or a known digital TV broadcasting format including 1080/60I (1080 pixels and 60 frame interlaced) and 720/60P (720 pixels and 60 frame progressive non-interlaced).

In the case that the audio/visual signals are received from the game server 10 through the CATV network 40, the image processor 120, image processing unit 138 and sound processing unit 171 are not operated, and hence audio/visual signals from the game console 60 are not delivered to the TV monitor. In this case, under operation, the audio/visual signals and upstream/downstream data signals are sent and received separately through different bands of the CATV network. As a result of the high speed CATV network connection, such signals can be expected to arrive at the TV monitor 80 and game console 60 with sufficient proximity in time so that user inputs effected at the game console 60 can be used to influence changes in audio/visual content on the TV monitor 80. In this case, data signals packaged as data packets and bearing IP (or other network protocol) addresses designated for the game server 10 and game console 50, respectively, are transferred through the CATV network between the router 30 and cable modem 50, whereas the multiplexed audio/visual data is sent out through the CATV network as signals for reception by the TV monitor 80 which includes the necessary decoding devices (not shown) therein for decoding and displaying of the multiplexed audio/visual data.

Typical operations of the game console 60 shall now be described.

Non-Networked Local Operation: In this mode, the game console 60 is operated without need for the network connection, wherein a game program is loaded from a CD-ROM or DVD disk media 70 into the main memory 114 of the game console 60, and upon execution therein, sound and graphics controls are processed by the image processor 120, IPU 138 and/or SPU 171 in accordance with user inputs through the game controller or input device 132, and such audio and video outputs are sent to the display monitor 80. Typically, in this case, the TV monitor supports a standard popular TV format such as NTSC or PAL.

Networked Operation with Local Audio/Visual Control: In this mode, an online gaming experience across a network 40 can be realized in accordance with the conventional method of FIG. 3. In such a case, the TV monitor 80 facilitates only the standard formats such as NTSC or PAL supported by the graphics capability of the game console 60. In this case, although respective server and console side program components are executed in consort, with data sharing taking place across the bi-directional CATV network 40, upon execution of the console-side program component loaded into the main memory 114, sound and graphics controls are still processed by the image processor 120, IPU 138 and/or SPU 171, respectively, in accordance with user input from the game controller or input device 132 and/or updated status information received from the game server 10 through signal band a, and such audio and video outputs are sent to the display monitor 80.

Networked Operation with High-Resolution Audio/Visual Signals Delivered Through CATV Network: Under this realization, the present invention enables users to enjoy a higher resolution of graphics quality than the networked game console 60 can generate. When a TV monitor 80 is used which supports a higher resolution than current most widely available TV formats such as NTSC and PAL, for example assuming the user employs a TV monitor supporting higher resolution digital TV broadcasting formats such as 1080/60I and 720/60P, the user, by actuating a button, for example, on the game console 60 or game controller 17, can disable local processing of audio and video signals by the image processor 120, IPU 138 and SPU 171, and in place thereof, receive digitally encoded audio and visual signals output from the game server 10 through CATV network 40, whereby a picture quality comprising a video signal of significantly higher resolution can be displayed on the TV monitor 80. It is also possible that the disablement of the image processor 120, IPU 138 and SPU 171 can be performed automatically by detecting, through means of an identifier code or the presence of network software on the CD-ROM or DVD disk 70, that the game program thereon is intended for online operation through the network 40, together with sensing the resolution capabilities of the TV monitor 80, in which case if the TV monitor 80 is capable of handling the higher resolution graphics generated by the game server 10, the audio and video output from the game console will be automatically disabled in favor of audio/visual signals delivered over signal line b. In either case, the system is freely adaptable, and therefore the user can enjoy the highest quality of graphics that the TV monitor 80 can support.

Non-Gaming Broadcast Mode: Even for users who do not currently engage in online gaming or who do not own a networked game console, the head end facility of the CATV network can provide viewers an opportunity to observe ongoing online gaming content on a TV monitor. Thus, the system offers an opportunity for online game service provides and game content publishers to market their products to potential users.

It shall be understood by the above description of various modes of operation of the present invention, that the invention is easily adaptable to different requirements, depending on the type of game software used with the system, whether intended for networked based applications or not, and further the system is adaptable to fit the graphics capabilities of the TV monitor 80, thereby increasing the versatility of the system for use across multiple software and equipment platforms.

Further applications of the present invention, aside from online gaming as described hereinabove, may be envisaged in the following situations, understanding that the following descriptions are offered as potential examples only and the present invention is by no means limited to such examples.

(1). Networked Real-Time Voting. Participants can indicate voting, or responses to various issues, through the controller of the game console 60, wherein votes received from multiple users can be tallied in the server station 10, and a graphical output indicative of a voting result from the server 10 can be transmitted through the CATV network 40 and displayed on the TV monitor 80.

(2) Virtual Gambling. A simulated gambling scenario, such as horse racing or roulette, can be realized. Users can place bets through the CATV network 40 using the controller 17 of the networked game console 60. The game server 10 accumulates the bets over a given period of time, and then simulates a gambling experience after betting has been closed.

(3) Interactive Collaborative Art Performance. A case is assumed in which each of multiple users are responsible for a musical instrument or other artistic implement, each implement being assigned to one networked game console 60 and operated by means of the controller input device 132. When users place inputs through the networked game console 60, such input data is transmitted to the game server 10, wherein the game server 10 generates sound and graphics (for example, music and dancing of a character or avatar) based on multiple user inputs. The game server integrates the input data, and outputs the generated graphics and sound to the TV monitor 80 through the CATV network 40.

(4) Multiple Ending Drama. An interactive drama depicting a scenario or plot line which is interactively determined from the actions of viewers using respective networked game consoles 60 can be realized. Inputs received from the users modify the outcome of the scenario based on a majority accumulation (or in some cases a minority, or any other statistical determination) of input actions selected by multiple viewers at any time during the progression of the drama.

In the description of the present invention above, the bi-directional data transfer between the game console 60 and the game server 10, as well as the unidirectional audio/visual data which is received by the game console 60 from the game server 10, have been explained as occurring in respective frequency divided bands of a CATV network. It should be appreciated, however, that the invention is not limited to the use of frequency divided bands, but may be implemented with other broadband techniques currently under use or to be developed, for example spectrum distributed technologies, through which the network connections necessary for accomplishing the present invention can, broadly speaking, reside in different channels which are logically divided over a commonly used network infrastructure.

It shall be understood that various modifications will be apparent and can be easily made by persons skilled in the art without departing from the scope and spirit of the present invention. Accordingly, the following claims shall not be limited by the descriptions or illustrations set forth herein, but shall be construed to cover with reasonable breadth all features which may be envisaged as equivalents by those skilled in the art.

What is claimed is:

1. A system for providing online content comprising:
 a server side facility comprising a server terminal;
 a client side facility comprising a client console;
 a network connection for connecting said server side facility and said client side facility;
 a display device located in said client side facility and connected with said server terminal through said network connection, wherein input data is transmitted from said client console to said server terminal and video signals are transmitted from said server terminal to said display device, and wherein said client console is capable of outputting local video signals to said display device, and is capable of selectively disabling output of the local video signals from said client console when said video signals are transmitted directly from said server terminal to said display device without passing through the client console.

2. The system according to claim 1, wherein said network connection comprises a network for establishing a first connection between said client console and said server terminal and a second connection between said server terminal and said display device, said first and second connections residing in different channels which are logically divided over a commonly used network infrastructure.

3. The system according to claim 2, wherein said first connection between said client console and said server terminal comprises a bi-directional data connection enabling uploading of data from said client console to said server terminal and downloading of data from said server terminal to said client console.

4. The system according to claim 3, wherein said data connection enabling uploading and said data connection enabling downloading reside in different channels.

5. The system according to claim 1, wherein said server side facility further comprises a signal multiplexing device for multiplexing said video signals which are transmitted to said display device.

6. The system according to claim 2, wherein said client side facility further comprises a signal splitter for splitting said network connection into said different channels.

7. The system according to claim 1, further comprising a plurality of client side facilities each respectively connected to said server side facility, wherein respective user input data from a plurality of client consoles are transmitted to said server side facility, and said video signals transmitted from said server terminal represent a collective processing of said respective user input data.

8. The system according to claim 7, comprising a further display device which is not connected to a client console, wherein said further display device receives said video signals from said server terminal.

9. A method for providing online content comprising the steps of:

establishing a bi-directional network data connection between a client console and a server terminal;

executing a client side program component in said client console;

executing a server side program component in said server terminal;

establishing a unidirectional signal connection between said server terminal and a display device, for enabling video signals generated in said server terminal to be transmitted from said server terminal to said display device;

transferring data between said client console and said server terminal for use by said client side program component and said server side program component, respectively, over said bi-directional network data connection;

outputting said video signals from said server terminal in response to execution of said server side program component;

transmitting said video signals over said unidirectional signal connection to said display device;

outputting local video signals from said client console to said display device; and selectively disabling output of the local video signals from said client console when said video signals are transmitted from said server terminal to said display device.

10. The method according to claim 9, wherein said network connection comprises a network and said bi-directional data connection and said unidirectional signal connection reside in different channels which are logically divided over a commonly used network infrastructure.

11. The method according to claim 10, further comprising the step of uploading of user input data from said client console to said server terminal and downloading of status data from said server terminal to said client console over said bi-directional data connection.

12. The method according to claim 11, wherein said user input data is uploaded from said client console in one channel and said status data is downloaded from said server terminal in another channel which is different from said one channel.

13. The method according to claim 9, further comprising the step of multiplexing said video signals which are output from said server terminal and transmitted to said display device.

14. The method according to claim 10, further comprising the step of signal splitting the network connection into said different channels.

15. The method according to claim 9, further comprising the steps of:

providing a plurality of client consoles each respectively connected to said server terminal;

transmitting respective user input data from said plurality of client consoles to said server terminal; and transmitting said video signals from said server terminal which represent a collective processing of said respective user input data.

16. The method according to claim 15, further comprising the steps of:

providing a further display device which is not connected to a client console; and receiving, in said further display device, said video signals from said server terminal to thereby enable viewing of online interactive content conducted by other users.

17. A system for providing online content comprising:

a server side facility comprising a server terminal;

a client side facility comprising a client console;

a network connection for connecting said server side facility and said client side facility;

a display device located in said client side facility and connected with said server terminal through said network connection, wherein input data is transmitted from said client console to said server terminal and video signals are transmitted from said server terminal directly to said display device without passing through said client console.

18. The system according to claim 17, wherein said network connection comprises a network for establishing a first connection between said client console and said server terminal and a second connection between said server terminal and said display device, said first and second connections residing in different channels which are logically divided over a commonly used network infrastructure.

19. The system according to claim 18, wherein said first connection between said client console and said server terminal comprises a bi-directional data connection enabling uploading of data from said client console to said server terminal and downloading of data from said server terminal to said client console.

20. The system according to claim 19, wherein said data connection enabling uploading and said data connection enabling downloading reside in different channels.

21. The system according to claim 17, wherein said server side facility further comprises a signal multiplexing device for multiplexing said video signals which are transmitted to said display device.

22. The system according to claim 18, wherein said client side facility further comprises a signal splitter for splitting said network connection into said different channels.

23. The system according to claim 17, further comprising a plurality of client side facilities each respectively connected to said server side facility, wherein respective user input data from a plurality of client consoles are transmitted to said server side facility, and said video signals transmitted from said server terminal represent a collective processing of said respective user input data.

24. The system according to claim 23, comprising a display device which is not connected to a client console, wherein said further display device receives video signals from said server terminal.

25. The system according to claim 17, wherein said client console is capable of outputting local video signals to said display device and comprises means for selectively disabling output of the local video signals from said client console when said video signals are transmitted from said server terminal to said display device.

26. A method of providing online content comprising the steps of:
  establishing a bi-directional network data connection between a client console and a server terminal;
    executing a client side program component in said client console;
    executing a server side program component in said server terminal;
  establishing a unidirectional signal connection between said server terminal and a said display device, for enabling video signals generated in said server terminal to be transmitted from said server terminal to said display device;
    transferring data between said client console and said server terminal for use by said client side program component and said server side program component, respectively, over said bi-directional network data connection;
    outputting said video signals from said server terminal in response to execution of said server program component; and
    transmitting said video signals over said unidirectional signal connection to said display device while bypassing said client console.

27. The method according to claim 26, wherein said network connection comprises a network and said bi-directional data connection and said unidirectional signal connection reside in different channels which are logically divided over a commonly used network infrastructure.

28. The method according to claim 27, further comprising the step of uploading of user input data from said client console to said server terminal and downloading of status terminal to said client console over said bi-directional data connection.

29. The method according to claim 28, wherein said user input data is uploaded from said client console in one channel and said status data is downloaded from said server terminal in another channel which is different from said one channel.

30. The method according to claim 26, further comprising the step of multiplexing said video signals which are output from said server terminal and transmitted to said display device.

31. The method according to claim 27, further comprising the step of signal splitting the network connection into said different channels.

32. The method according to claim 26, further comprising the steps of:
  providing a plurality of client consoles each respectively connected to said server terminal;
    transmitting respective user input data from said plurality of client consoles to said server terminal; and
    transmitting said video signals from said server terminal which represent a collective processing of said respective user input data.

33. The method according to claim 32, further comprising the steps of:
  providing a further display device which is not connected to a client console; and
  receiving, in said further display device, said video signals from said server terminal to thereby enable viewing of online interactive content conducted by other users.

34. The method according to claim 26, further comprising the steps of:
  outputting local video signals from said client console to said display device; and
  selectively disabling output of the local video signals from said client console when said video signals are transmitted from said server terminal to said display device.

35. A system for enabling online execution of instructions for interactive content, comprising:
  a server side facility comprising a server terminal;
  a client side facility comprising a client console;
  a network connection for connecting said server side facility and said client side facility;
  a display device located in said client side facility and connected with said server terminal through said network connection, wherein input data is transmitted from said client console to said server terminal and video signals are transmitted from said server terminal to said display device, such that when said input data is transmitted from said client console to said server terminal, said server terminal executes instructions based on said input data, video signals are generated by said server terminal as a result of execution of said instructions, and the generated video signals are transmitted from said server terminal directly to said display device without passing through said client console.

36. The system according to claim 35, wherein said network connection comprises a network for establishing a first connection between said client console and said server terminal and a second connection between said server terminal and said display device, said first and second connections residing in different channels which are logically divided over a commonly used network infrastructure.

37. The system according to claim 36, wherein said first connection between said client console and said server terminal comprises a bi-directional data connection enabling uploading of data from said client console to said server terminal and downloading of data from said server terminal to said client console.

38. The system according to claim 37, wherein said data connection enabling uploading and said data connection enabling downloading reside in different channels.

39. The system according to claim 35, wherein said server side facility further comprises a signal multiplexing device for multiplexing said video signals which are transmitted to said display device.

40. The system according to claim 36, wherein said client side facility further comprises a signal splitter for splitting said network connection into said different channels.

41. The system according to claim 35, further comprising a plurality of client side facilities each respectively connected to said server side facility, wherein respective user input data from a plurality of client consoles are transmitted to said server side facility, and said video signals transmitted from said server terminal represent a collective processing of said respective user input data.

42. A method for an online program execution, comprising:

establishing a bi-directional network data connection between a client console and a server terminal;

executing a client side program component in said client console;

executing a server side program component in said server terminal;

establishing a unidirectional signal connection between said server terminal and a display device, for enabling video signals generated in said server terminal to be transmitted from said server terminal directly to said display device;

transmitting input data from said client console to said server terminal, such that when said input data is transmitted, said server terminal executes program instructions based on said input data, and said video signals are generated by said server terminal as a result of execution of said program instructions; and transmitting the generated video signals over said unidirectional signal connection from said server terminal directly to said display device without passing through said client console.

43. The method according to claim 42, wherein said network connection comprises a network and said bi-directional data connection and said unidirectional signal connection reside in different channels which are logically divided over a commonly used network infrastructure.

44. The method according to claim 43, further comprising the step of uploading of user input data from said client console to said server terminal and downloading of status data from said server terminal to said client console over said bi-directional data connection.

45. The method according to claim 44, wherein said user input data is uploaded from said client console in one channel and said status data is downloaded from said server terminal in another channel which is different from said one channel.

46. The method according to claim 42, further comprising the step of multiplexing said video signals which are output from said server terminal and transmitted to said display device.

47. The method according to claim 43, further comprising the step of signal splitting the network connection into said different channels.

48. The method according to claim 42, further comprising the steps of:

providing a plurality of client consoles each respectively connected to said server terminal;

transmitting respective user input data from said plurality of client consoles to said server terminal; and transmitting said video signals from said server terminal which represent a collective processing of said respective user input data.

49. The method according to claim 48, further comprising the steps of:

providing a further display device which is not connected to a client console; and receiving, in said further display device, said video signals from said server terminal to thereby enable viewing of online interactive content conducted by other users.

50. The method according to claim 42, further comprising the steps of:

outputting local video signals from said client console to said display device; and selectively disabling output of the local video signals from said client console when said video signals are transmitted from said server terminal to said display device.

\* \* \* \* \*